April 26, 1960  K. ZWICK ET AL  2,933,985
MACHINE FOR PRODUCING THREE-DIMENSIONAL SHAPES
Filed April 4, 1957  6 Sheets-Sheet 1

INVENTORS
Kurt Zwick,
Franz Rossberger,
BY
John B. Brady
ATTORNEY

April 26, 1960     K. ZWICK ET AL     2,933,985
MACHINE FOR PRODUCING THREE-DIMENSIONAL SHAPES
Filed April 4, 1957     6 Sheets-Sheet 3

FIG. 4

INVENTORS
Kurt Zwick,
Franz Rossberger,
BY John B. Grady
ATTORNEY

April 26, 1960 K. ZWICK ET AL 2,933,985
MACHINE FOR PRODUCING THREE-DIMENSIONAL SHAPES
Filed April 4, 1957 6 Sheets-Sheet 4

FIG_5a

FIG_5b

FIG_5c

INVENTORS
Kurt Zwick,
Franz Rossberger,
BY John B. Brady
ATTORNEY

April 26, 1960 K. ZWICK ET AL 2,933,985
MACHINE FOR PRODUCING THREE-DIMENSIONAL SHAPES
Filed April 4, 1957 6 Sheets-Sheet 5

FIG_7

INVENTORS
Kurt Zwick,
Franz Rossberger,
BY
John B. Brady
ATTORNEY

United States Patent Office 2,933,985
Patented Apr. 26, 1960

2,933,985
MACHINE FOR PRODUCING THREE-DIMENSIONAL SHAPES

Kurt Zwick and Franz Rossberger, Munich, Germany, assignors to Hans Deckel, Munich, Germany, and Friedrich Wilhelm Deckel, Zug, Switzerland Application April 4, 1957, Serial No. 650,683

Claims priority, application Germany April 6, 1956

11 Claims. (Cl. 90—13)

The present invention relates to a machine for producing three-dimensional shapes.

Shapes in three dimensions, exemplified for instance by molds for castings, press or stamping dies and so forth, are generally machined with the help of a pattern on a copy milling machine. The disadvantage of this method is that the pattern must first be made by a tedious and costly process of production by hand in accordance with the design in a drawing or sketch and that this handmade pattern then serves as a basis for producing the actual die.

It is the object of the invention to avoid this complicated procedure.

The present invention provides a machine for machining three-dimensional shapes into workpieces by feeding a tool in consecutive passes along adjacent paths, in which a work table for the blank is adjustable in three directions perpendicular to each other and a tool support which is movable to positions parallel with itself is guided in a plane set at an angle to the direction of the tool feed, and in which the movement of the tool support is derived from one member of a linkage that is connected with the tool support through a gimbal mount, the said linkage being preferably embodied in a two-dimensional crank motion and arranged to pivot about at least one axis normal to the axis of the motion and/or the length of at least one member thereof being adjustably variable, the angular position of the motion and/or the length of the members thereof and/or the adjustment of the workpiece in directions perpendicular to the direction of the tool feed being controllable by reference to feeler members and master cams associated therewith, the master cams participating in the movements of the blank in at least one direction, preferably in the direction of the tool feed.

The pedestal 1 (Fig. 1) of the machine carries a table support 2 adapted to be vertically transversed by means of a handwheel 3. An intermediate slide 4 mounted thereon can be transversed by means of a handwheel 5 in the horizontal direction, i.e. in the drawing to the right and to the left. On this slide 4 is the actual work table 6 which is arranged to be transversed in the horizontal direction by means of a crank handle 7, but at right angles to the direction of transverse of the slide underneath, i.e. in the drawing from the front to the back and vice versa. The work 8 is clamped to the table 6. The rear column 10 of the pedestal 1 of the machine carries a parallel linkage 12 which is vertically displaceable on guides 11. The free ends of the two arms of the parallel linkage support a guide 13, on which a tool-supporting cross beam 14 is slidably mounted. This cross beam 14 carries the tool spindle 15 and a tracer arm 16. Hence, the spindle and the tracer arm can be moved as may be desired in any direction on the two guides 11 and 13 and with the help of the parallel linkage 12, the spindle and tracer arm always move along parallel paths.

Figures 1, 3, 6:
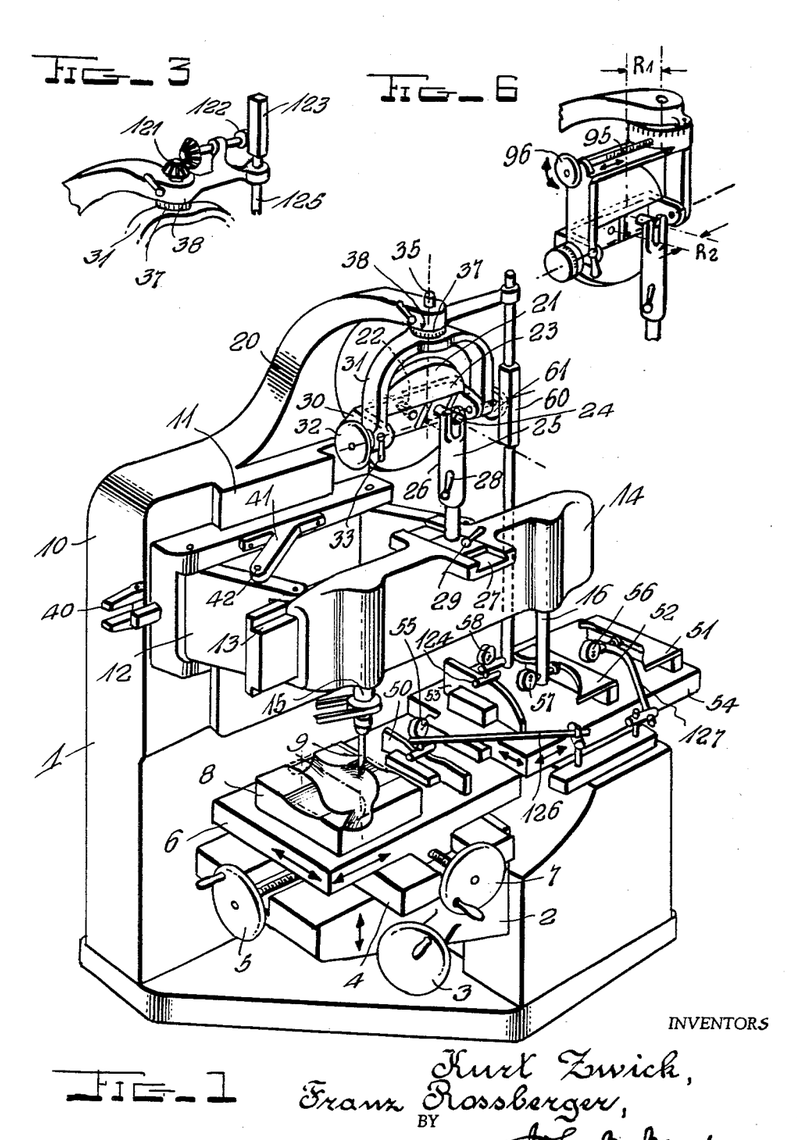
Fig. 1 is a perspective view of a machine tool in accordance with the invention.
Fig. 3 is a modification of part of the machine shown in Fig. 1.
Fig. 6 is a detail of a modification of the machine shown in Fig. 1.

However, the freedom of movement of the cross beam 14 is limited by a device suspended from an overhanging arm 20 on the machine pedestal 1. This device consists principally of a disc 21 adapted to be turned on an axis 22 and provided on its front face with a guide slot 23 for a crank pin 24. The crank pin is movably joined to a crank arm 25 for instance by means of a ball and socket joint. The crank arm 25 is in turn connected with the cross beam 14 through two movable guide elements 26 and 27, the guide element 26 permitting vertical displacement and the guide element 27 permitting horizontal displacement. Both guide elements can be locked up by clamps 28 and 29.

The arrangement that has been described links the tool spindle with the frame of the machine and hence with the work in such a way that any relative movement between tool and work is restricted to a single path of adjustably controllable shape and magnitude.

The shape of the path is determined by the supplementary device mounted on the overhanging arm 20. For instance, if the plane of the disc 21 is vertical and the two clamps 28 and 29 have been tightened, then the cross beam 14 and hence the tool 9 can move only along a circular path of which the radius is governed by the distance between the axis 22 of the disc 21 and the crank pin 23. By displacing the crank pin 23 the size of the predetermined path of the relative motion between tool and work can therefore be controlled. The cross beam 14 can move only along this predetermined path and the tool 8 will therefore machine the work along a circular track. In the illustrated embodiment the disc 21 is not directly mounted on the overhanging arm 20, but its pivot pin 22 can be angularly tilted in relation thereto in two directions. The pivot pin 22 of the disc 21 is affixed to a U-shaped bracket 30 which is itself suspended in a gimbal 31, in which it can be pivotally deflected about a horizontal axis A by means, for instance, of a handwheel 32 and then locked in any position by a clamping lever 33. The gimbal 31 can be rotated on a vertical axis 35B at the end of the arm 20 and likewise fixed by clamping means 36 in any desired angular position by reference to a scale 37 which registers with a mark 38 and gives a reading of the angle to which it has been adjusted.

For instance, if the plane of the disc 21 is turned about the horizontal axis A by operation of the handwheel 32, then the track of the tool will continue to be circular. However, the circle will not now be contained in a vertical plane but in a plane that is inclined with the angle of inclination of the disc, so that the circle machined into the work will be at that angle of inclination. The device will also generate elliptical tracks. To this end the movement of the cross beam 14 in one direction must be locked. This is done by the locking members 40 and 41 respectively. The rotatable locking member 40, when swung forward, stops a displacement of the cross beam 14 in the vertical direction, that is to say, on the guide 11, whereas the locking member 41 with lock pin 42 lock the parallel linkage 12 and thereby prevents the cross beam 14 from moving in the horizontal direction perpendicular to the guide 13. Let it be assumed, for instance, that the horizontal cross beam motion has been locked, as shown in Fig. 1. The clamp 29 is released and the disc 21 adjusted to an angle of tilt which corresponds with the desired ratio of the two principal axes of the ellipse it is desired to generate. When the crank disc moves, the crank arm 25 in guideway 27 will move in relation to the cross beam 14 because the latter can participate only in the vertical component of motion of the crank pin 24, but not its horizontal component perpendicular to the guide 13. The motion of the tool 9 will then trace out the projection of the circular movement of the crank pin 23 on a vertical plane. The tool 15 will therefore machine the work along an elliptical path contained in a vertical plane. If in the converse case the locking means 40 are brought into operation to stop vertical motion of the cross beam 14 and the clamp 28 is released to permit the required vertical compensatory movement between crank pin 24 and the cross beam 14, then the tool will machine along an ellipse in a horizontal plane.

It will therefore be understood that the arrangement described will permit, on the one hand, a relative movement between the work and the tool only along a single path of predetermined shape and magnitude which can be adjustably controlled as desired.

In the apparatus shown the displacement of the work in one direction is utilized to control the displacement of the work in other directions along a path, of which the shape and size can be predetermined through the medium of appropriately shaped master cams.

In the apparatus shown in Fig. 1 four such master cams 50, 51, 52 and 53 are provided. The cam 50 is arranged on the worktable 6 and the cams 51 to 53 are arranged on an auxiliary table 54 which is connected with the work table 6 to move in both horizontal directions (but not in the vertical direction) with the table 6. In other words, the master cams participate in the motions of the work table and hence of the work in at least one direction, viz. in the illustrated example, in the two horizontal directions. Each of these master cams is associated with a micrometer gauge 55, 56, 57 and 58, each of which is mounted off the work table and off the auxiliary table 54. The master cams extend, as shown in the example, in the direction of traverse of the work which is controlled by the handwheel 7, that is to say, from front to back. The master cams 50, 51, 52 and 53 serve to control the various dimensional factors that determine the contour and position of the generated shape. The master cam 50 determines the elevation that must be given to the table support by the turning of the handwheel 3. The master cam 51 determines the amount of displacement of the work in the horizontal direction of the guide 13 that must be set by means of the handwheel 5. The tracing fingers 55 and 56 associated with cams 50 and 51 are mounted on arms 126 and 127 rigidly secured to the frame of the machine. The master cam 52 serves to preset the radius of rotation of the crank pin 24 on the disc 21. Finally, the cam 53 controls the spatial angle of tilt of disc 21.

The manner of operation is as follows. The shape which is to be imparted to the blank is produced by consecutive passes of the milling cutter by movement of the cross beam along its guide 13, the blank being fed forwardly or rearwardly by means of handwheel 7 in the direction of tool feed according to the depth of the cut after each pass of the cutter. Since this horizontal feed motion simultaneously displaces the master cams 50, 51, 52 and 53 in relation to the gauges 55, 56, 57 and 58, the latter will indicate a deflection from their zero positions depending upon the shape of the master cams which determine the correct relative positions of all the working parts at the start of each pass of the tool. Before the tool begins the next pass all the gauges must first be zeroized. In other words, the gauge 55 must be reset to zero by operation of the handwheel 3 and the correct vertical level of the blank thus obtained. Then the gauge 56 must be reset to zero by the horizontal displacement of the table by means of the handwheel 5 and hence the correct transverse position of the blank is obtained. Then the radius of action of the crank pin 24 is readjusted by the slidable displacement of the crank pin in the guide slot 22—which in this initial position is horizontal—until the gauge 57 registers zero and the correct radius for the ensuing pass is found. Finally, the handwheel 32 is operated to turn the plane of the crank disc 21 until the gauge 58 indicates zero and the correct shape of the ellipse is thereby set. In the illustrated embodiment the gauge 58 is coupled with the crank disc through a rack 60 and a pinion 61 mounted on the axle of the U-shaped bracket 30.

In this way the position (vertical level and horizontal displacement) as well as the shape (eccentricity of the ellipse) of the adjustable path of action of the tool is controlled in dependence upon the displacement of the work in one direction, namely in the horizontal direction by the handwheel 7.

After the milling cut has been performed, for instance, by moving the cross beam by hand along its guideway so that the tool follows the path determined by the crank disc, the work table is again laterally displaced by the depth of one out cut with the help of the handwheel 7; the gauges are again zeroized and the next pass of the cutter performed.

Figure 2A:
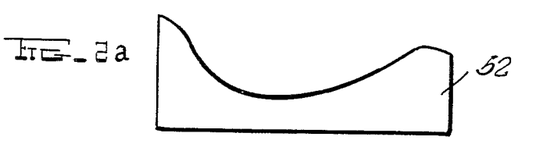
Figs. 2a–2f show a mould of a kind that can be produced on a machine according to the invention together with the associated master cams required for its production.
Figure 2B:
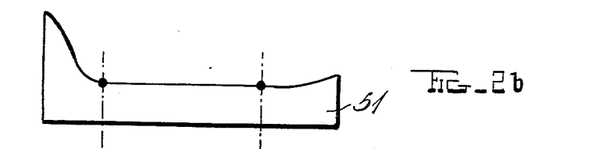
Figure 2C:
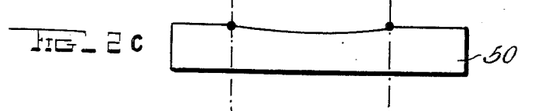
Figure 2D:
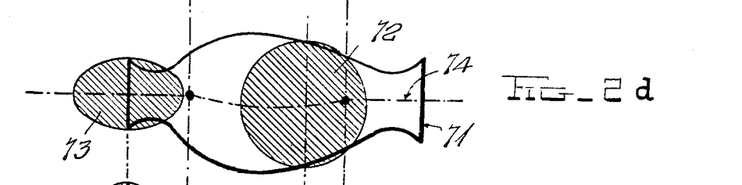

Figs. 2a–2f show a mold which can be produced under control of the several cams that have been described, for example, that of a flower vase of (Figs. 2d and 2e) of which the shape is that illustrated by the two relatively perpendicular vertical section 70 (Fig. 2e) and 71 (Fig. 2d). The two cross sections 72 and 73 are also shown in these vertical sections. As will be seen, the vase has a belly of circular section 72, a neck 73 of elliptic cross section and an axis 74 which is curved in both sections 70 and 71. The master cams required to produce this shape can be directly deduced from the drawing, i.e. from the two sections 70 and 71. The master cams 50 (Fig. 2c) and 51 (Fig. 2e) reproduce the shape of the axis in the two sections 70 and 71, whereas master cam 52 (Fig. 2a) serves to determine the radius of the cross sections and its shape corresponds with the thick contour 77 in section 70, since in view of the above described mode of operation of the machine the radius of the crank disc when the guide slot is horizontal, i.e. parallel to the plane of section 70, is controlled by this cam. Master cam 53 (Fig. 2f) controls the eccentricity (ovality) of the sections and its contour is therefore intermediate between that which corresponds with a circle and that which corresponds with an ellipse of infinite eccentricity, i.e. a straight line.

It will be readily understood that the contour of each of the master cams can be directly deduced from the sectional drawings. All that is required is a knowledge of the functional relationship between the eccentricity of the ellipses and the linear displacement of the rack 60. The possibility of producing any shape on a machine tool by direct reference to the drawing constitutes a very considerable economy when compared with the hitherto conventional method of producing a master pattern by hand. In the case of more complicated conformations the pattern maker first had to make a plaster or wood pattern from which the actual article was then produced by copying, for instance, on a copy milling machine. The economy is especially great if—and this can be done without difficulty—the desired finished product, say for example, a die can be directly machined without the intervention of a preliminary pattern.

It will be readily understood that the construction of the machine shown in Fig. 1 is merely one of many possible forms of construction of a machine for performing the invention.

For example, Fig. 3 illustrates a modification of the form of construction shown in Fig. 1, in which the rotation of the gimbal member 31 about a vertical axis B can be controlled through a transmission comprising bevel gears 121 and a pinion 122 in mesh with a rack 123 secured to a shaft 125 by a master cam. In this way, for instance, vertical circles or ellipses can be produced in a vertical plane of any desired angle of slant. This facility may be desirable, for instance, for producing curved pipes (elbows, transition bends) which in the illustrated machine will not require the use of an additional rotating table for performing the work.

Figure 4:
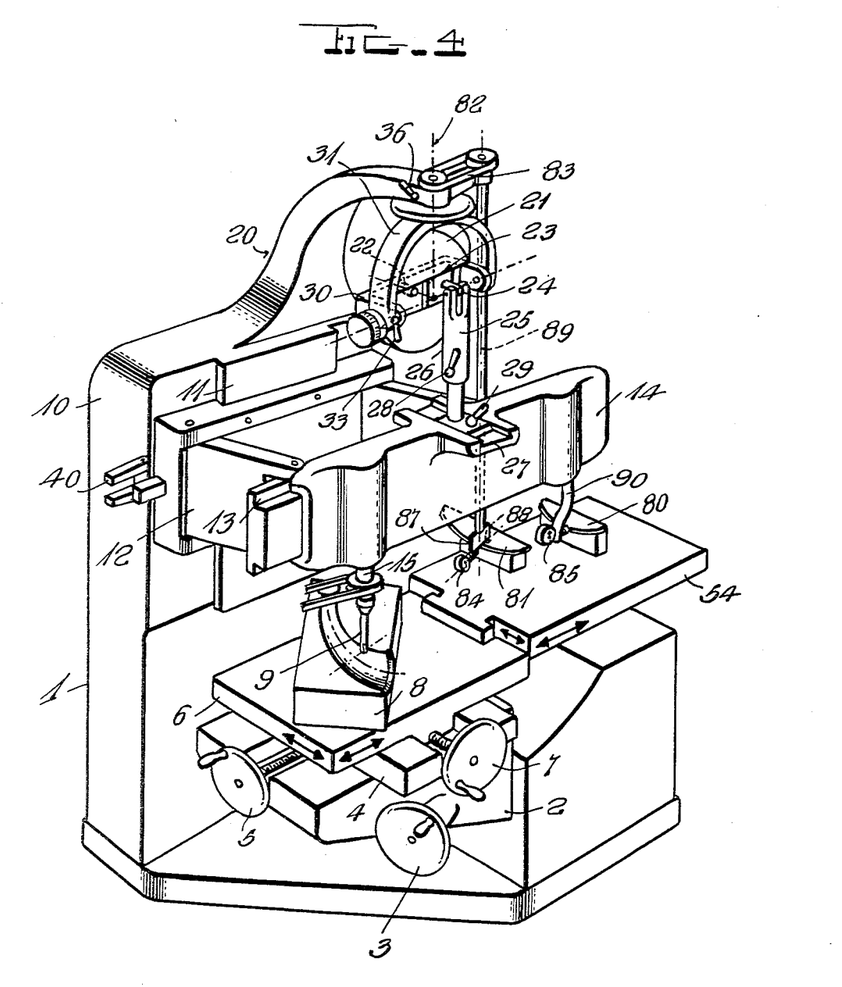
Fig. 4 is a perspective view of a slightly modified version of the machine illustrated in Fig. 1.

A similar arrangement is illustrated in Fig. 4 in which an elbow duct is in the course of being machined. This machine is similar in principle to that shown in Fig. 1, so that analogous parts are indicated by the same reference numerals. However, unlike Fig. 1 this machine has only two master cams 80 and 81. The master cam 81 controls the table traverse as well as the angularity of the crank disc about its vertical axis 82. This angular adjustment is transmitted, for instance, by means of a steel belt 83 to the holder of a mirror 88. The master cam 80 and its associated gauge 85 permit the crank radius of the disc to be set in the manner that has been already described.

The mirror 88 is rigidly connected with a gauge 84 and carries a register mark situated exactly in the axis of deflection 89 of the mirror. The object of the mirror is to determine the angular position of the disc 21 in such a way that the plane of the mirror in which the tracer point of the gauge 84 contacts the cam 80 is exactly normal to the cam contour. This is a known method and relies upon the fact that the plane of a mirror placed on a curve will be normal to the curve at the point of contact if the curve in front of the mirror and its reflected image appear to be in alignment without showing divergence. In view of the change in the angular position of the crank radius when the disc 21 is deflected, the gauge 85 which serves to pre-set the crank radius must be likewise at least approximately adjusted to this angular position. To this end the gauge is attached to a cranked arm 90 rotatably suspended from the cross beam. Generally it will be quite sufficient if this angle is adjusted by sight. However, angular divisions on each of the arms 89 and 90 or, if desired, a suitable mechanical coupling might be provided to keep the angular position of the cranked arm 90 and of the disc 21 in agreement. The gauge 85 could be dispensed with and adjustment made by reference to the mark on the mirror. After each pass of the tool the work is traversed by the required width of the cut. In view of the obliquity of the axis 92 (see Figs. 5a–5c) of the mould that is to be produced the additional use of a gauge 84 may require this adjustment to be effected by repeatedly adjusting the two handwwheels 5 and 7 whilst watching the position of the mirror 87 until the gauge 84 is back to zero. When this has been done the crank arm must be re-set by zeroization of the gauge 85 and the radius of the crank action and hence the cross sectional radius of the elbow at the point in question adjusted. Again in this form of construction the displacement of the work in a horizontal direction controls the displacement of the work in the other direction as well as the size, shape, and direction of the adjustable path through the intermediary of master cams.

Figure 5A:
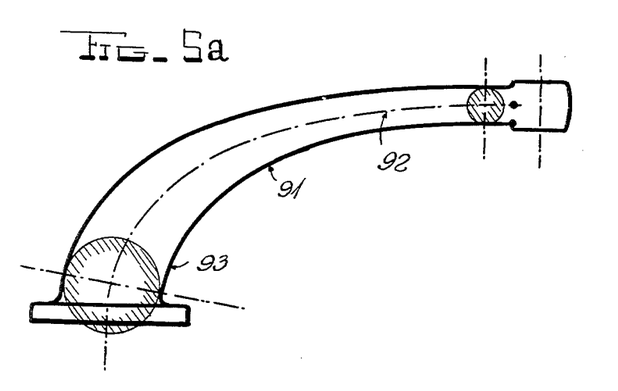
Figs. 5a–5c show a die of a kind that can be cut on such a machine of the kind illustrated in Fig. 4 together with the necessary master cams.
Figures 5B, 5C:
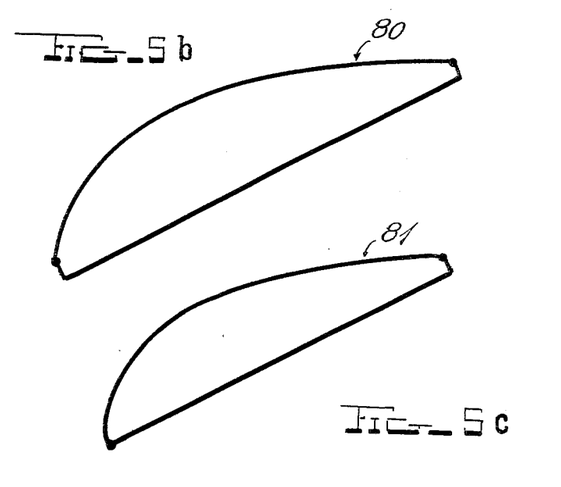

Figs. 5a–5c illustrate the two master cams 80 (Fig. 5b) and 81 (Fig. 5c) used in the machine shown in Fig. 4 as well as the mold 91 (Fig. 5a) produced with their help. The shapes of the master cams 80 (Fig. 5b) and 81 (Fig. 5c) can again be directly deduced from the drawings, the contour of the cam 80 being identical with the conformation of the axis 92 (Fig. 5a) and the cam 81 being identical with the profile 93 (Fig. 5a).

Fig. 6 illustrates another modified form of the suspension of the crank disc 21 from the overhanging arm 20. In this case the horizontal distance between the axis of rotation of the crank disc 21 from the vertical axis of rotation 35C on arm 20 can be adjusted by means of a spindle 95 and a handwheel 96. By this means a desired cross sectional contour can be milled along a circular central path of any desired radius. The arrangement may be used, for instance, if the axis of the pipe elbow shown in Fig. 4 is desired to be the arc of a circle. In such a case the master cam 81 in Fig. 4 can be omitted, so that only the master cam 80 will be required to determine the variations in radius, the gauge 85 being adjusted by means of the cranked arm 90 in the plane of the disc 21. Such an arrangement has the advantage of permitting a circular table to be dispensed with. A circular table is an expensive additional item and its employment is troublesome because the centre of a circular table must be carefully centralized with reference to the machine.

If an arrangement according to Fig. 6 is employed it is even possible to do without a table traverse altogether, and the tool feed can be controlled by rotation of the disc 21 about the vertical axis C.

Figure 7:
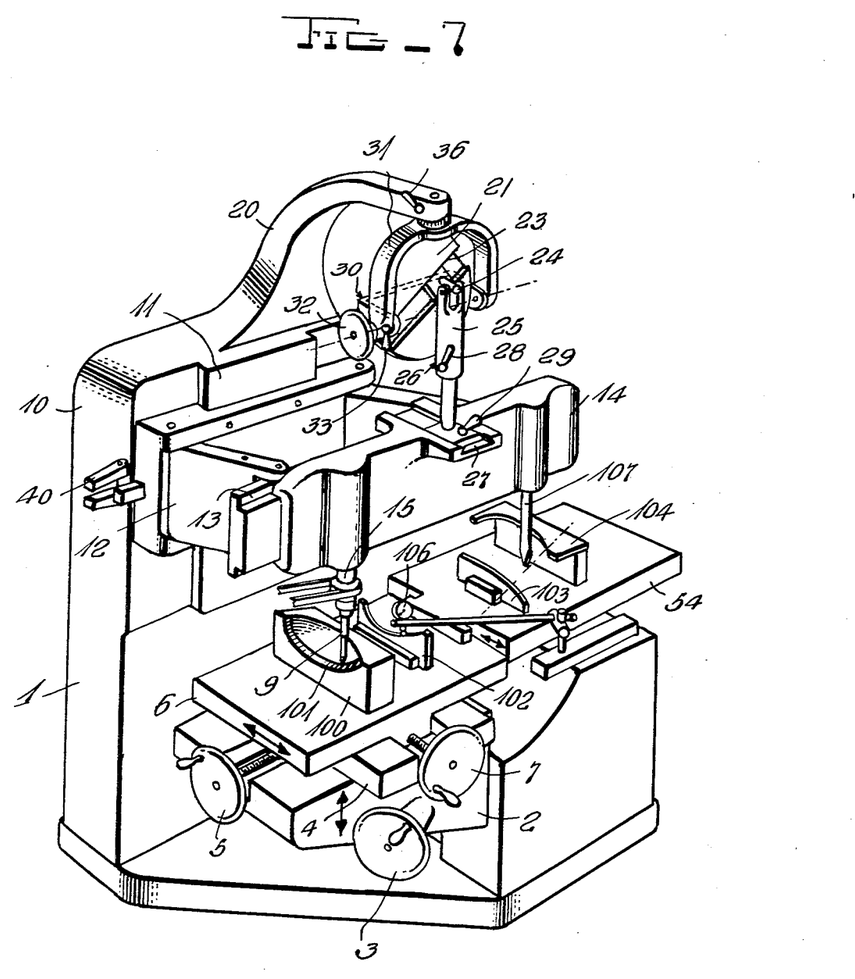
Fig. 7 is a perspective view of another modified version of the machine shown in Fig. 1.
Figure 8A:
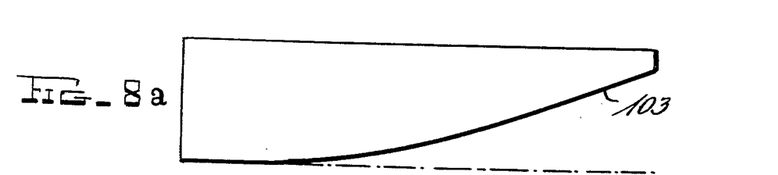
Figs. 8a–8h show a die produced on this modified machine tool together with the associated cams.
Figures 8B, 8C:
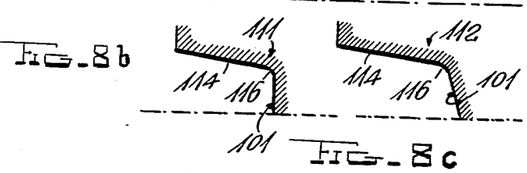
Figure 8D:
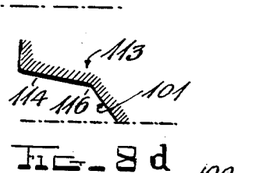
Figure 8E:
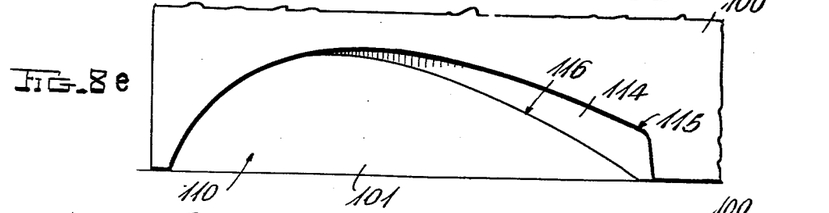
Figures 8F, 8G:
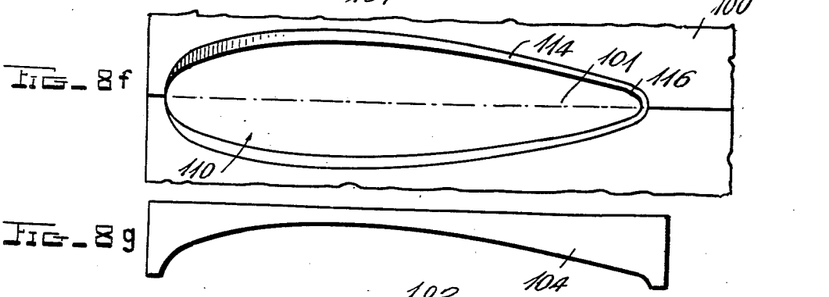
Figure 8H:
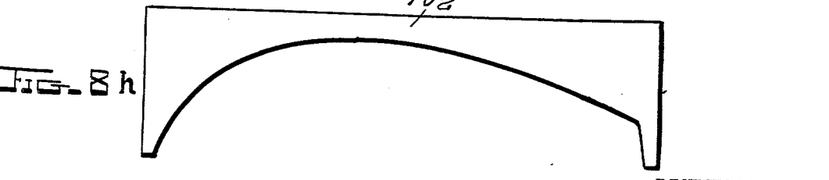

Fig. 7 shows yet another modification of the machine illustrated in Fig. 1. In this instance the path of the relative movement between the work and the tool is not elliptic or circular, but linear. Unlike the applications that have been so far described, the crank disc is not turned, but remains stationary whereas the crank pin 24 can slide in its guide slot 23. Let it be assumed that it is desired to produce a die 100 which has an arcuate proof surface 101 that varies in its steepness and boundary formation. Again both factors can be controlled in dependence upon the displacement of the table in the direction of traverse produced by the handwheel 7. A master cam 102 serves to determine the correct elevation of the table by means of the handwheel 3, whereas the master cam 103 serves to determine the angularity of the guide slot 23, and the master cam 104 the lateral movement of the cross beam. The work is displaced by the handwheel 7 by the width of the cut after each pass of the milling tool; the table is then adjusted for height by reference to a gauge 106, and the tilt of the guide slot is adjusted until the tracer point makes contact with the master cam 103. If desired, the end of the tracer may also be provided with a gauge. When the position and the inclination of the tool path have been thus pre-set, the cross beam is moved to the right and the corresponding cut machined into the work. The spindle movement to the right is limited by the tracer point 107 coming into contact with the master cam 104. Figs. 8a–8b show the relationship of shape of the positive work 110 and the associated dies and cams. The sections 111 (Fig. 8b), 112 (Fig. 8c) and 113 (Fig. 8d) of the hollow machined die 100 (Figs. 8e and 8f) reveal the different inclinations of the roof surface 114. The master cams 102 (Fig. 8b) and 104 (Fig. 8g) correspond with the contours 115 and 116 in the drawing. The shape of master cam 103 (Fig. 8a) as shown can be deduced from sections 111 (Fig. 8b), 112 (Fig. 8c) and 113 (Fig. 8c). The embodiment according to Fig. 7 is principally identical with the embodiment shown in Fig. 1; it merely shows another way of using the same machine. The only reasons why parts 58, 60, 61, of Fig. 1, are not likewise shown in Fig. 7 is that they are not necessary for illustrating the use of the machine shown in this drawing.

The crank motion is pivotable around a horizontal axis in the gimbal 31 as well as around a vertical axis (together with gimbal 31). In addition to Fig. 1, Fig. 3 shows how not only the swivelling movement around the horizontal axis but also the swivelling movement around the vertical axis is transmitted to a feeler cooperating with a further cam.

It will be clear that the described arrangements are only a few examples of many possible forms of construction and that the invention is by no means limited to the illustrated embodiments.

Figure 2E:
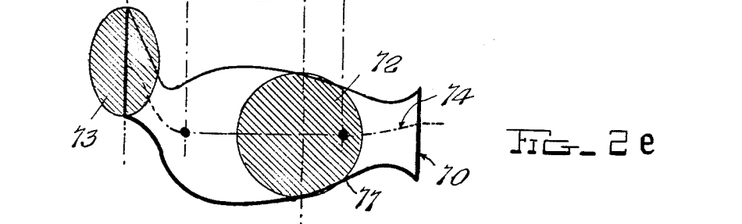
Figure 2F:
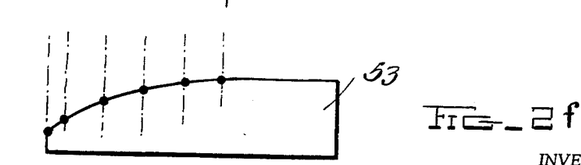

The machine also permits simpler shapes to be produced, for instance, a modification of that shown in Figs. 2d and 2e, in which all the sections are circular. In such a case only the master cams 50 (Fig. 2c) and 51 (Fig. 2b) and 52 (Fig. 2a) will be required for determining the table traverse and the crank disc radius and their contours can be readily derived from the drawings.

It is, of course, quite possible to employ some other arrangements for limiting the relative motion between the work table and the tool. For example, in the illustrative embodiment shown in Fig. 1 the crank disc might be replaced by a link quadrilateral of which one member, say the length of one arm, was determined by the second master cam varying the size of the concavity produced such as a catenary curve, or in which a third master cam controlled a second arm for the determination of the nature of the concavity, e.g. the variation of the curvature of the catenary. It will be clear that by appropriately designing the mechanism other shapes and modifications of such shapes can be generated. In every case it is the essential feature of the invention that in dependence upon the displacement of the work in one direction the size and shape of the track of the controllable tool motion as well as the displacement of the work in the other direction can be determined by reference to suitably shaped master cams.

It has been assumed in the present description that the displacement of the work and the readjustment of the crank disc and so forth are effected by hand by reference to gauges. It was also assumed in the description that the working movement of the milling tool was effected by moving the cross beam by hand. It will be readily understood, however, that all these motions can be power-generated and automatically performed. For instance, the power required for moving the tool may be driven, for example, from suitable drive means for the crank disc. Furthermore, the entire table traverse and the adjusting motion for truing with reference to the master cams may be automatic, the gauges being replaced by tracing means of a kind known in automation, which through appropriate programming controls for regulating the timing of consecutive motions act upon associated power amplifying means for operating the mechanism for setting the motion control elements. For example, the tracing means might be photocells and these might be adapted automatically to govern the motion control means by directly tracing the contours from the drawings. If this were done, even the production of master cams from the drawings could be avoided.

Moreover, the possibility is envisaged of transmitting the tool motion which is determined by the motion control means according to the invention to the cross beam 14 through a motion enlarging and reducing mechanism. Such mechanism would then permit—by enlarging the motion—for instance, to generate tool motions of larger size than the adjustability range of the motion control means would otherwise permit, or alternatively—by reducing the motion—to produce work of proportionately reduced sizes without changing the master cams.

Referring particularly to the embodiment of the invention shown in Fig. 1, the mode of operation is as follows: The tool is passed over the work piece in a certain movement controlled by the crank motion. Thereby a "line" (or "path") is produced. The next line will then be produced not by adjusting the tool in a vertical direction to its movement of operation, but by a feeding movement of the work piece by displacing the table 6 by means of spindle 7. If the tool is moved now anew in the same manner as described before, i.e., controlled by the crank motion, over the work piece, a second line is produced lying next to the first one. Whether the form of this second line is absolutely identical with the form of the first line will depend on the different adjustable factors that are varied according to the shapes of the cams. These variations depend on the form of the cams.

On feeding the clamping plate by means of the spindle 7 the cams, too, will be displaced with respect to the feelers 55, 56, 57, 58, so that the feelers are touching the cams at another point which is adjacent to the first one.

Therefrom results the transversal displacement of the work table by means of spindle 5 in conformity with the shape of cam 51 or the vertical displacement by means of spindle 3 in conformity with the shape of cam 50; the crank pin 24 will be displaced in conformity with the shape of cam 52 and the tilting position of the crank disc 21 will be adjusted in conformity with the shape of cam 53. If these adjustments have been made, the second line is produced by passing the tool over the work piece.

While we have described our invention in certain of its preferred embodiments we realize that modifications may be made and we desire that it be understood that no limitations upon our invention are intended other than may be imposed by the scope of the appended claims.

What is claimed is:

1. A machine for machining three-dimensional shapes of workpieces by moving a tool with respect to a blank in lines adjoined to each other by a feeding operation, comprising a machine frame, a worktable for a blank, means for adjusting said worktable in at least two directions perpendicular to each other, one of which is the feeding direction, a tool support movable in a plane transverse to the direction of the work feed, a linkage including a multiplicity of interconnected members articulated with said tool support, said linkage including a two-dimensional crank assembly, means for mounting said assembly on said machine frame, said assembly being arranged to pivot about at least one axis normal to the axis of the crank assembly, at least one member of said linkage being adjustably variable, a plurality of master cams, a feeler member individual to each of said cams and movable according to the contour thereof, the angular position of the crank assembly and the adjustment of the workpiece in directions perpendicular to the direction of the work feed being controllable by reference to the position of said feeler members with respect to said master cams, said master cams participating in the movements of the blank in at least one direction, and means for transmitting movements from said feeler members to said tool support whereby workpieces having the central axis thereof curved in three dimensions and the transverse sections thereof varying from section to section may be produced.

2. A machine for machining three-dimensional shapes of workpieces as set forth in claim 1 in which the two-dimensional crank assembly includes a crank disc connected with the tool support by a connecting rod of adjustably variable length.

3. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis.

4. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis, and wherein the distance of the principal axis of the crank disc from one tilt axis is adjustable.

5. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis, said crank disc carrying a crank pin, and wherein a connecting rod of adjustable length is arranged parallel with the tool axis extending between the tool support and the crank pin.

6. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis, said crank disc carrying a crank pin, wherein a connecting rod of adjustable length is arranged parallel with the tool axis extending between the tool support and the crank pin, and a vertically slidable coupling between the tool support and the connecting rod for locking the tool support against vertical movement.

7. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis, said crank disc carrying a crank pin, wherein a connecting rod of adjustable length is arranged parallel with the tool axis extending between the tool support and the crank pin, and a coupling between the toolholder and the connecting rod slidable in the direction of feed for locking the tool support in the direction of the tool head.

8. A machine for machining three-dimensional shapes of workpieces as set forth in claim 1 in which the two-dimensional crank assembly includes a crank disc connected with the tool support by a connecting rod of adjustably variable length wherein the principal axis of the crank disc is supported by a member which is tiltable in relation to the frame of the machine about a horizontal axis and a vertical axis, and wherein the tilting of the crank disc about one or both of its tilter axes is effective to control the vertical level of one of said feeler members through an associated gear train and wherein the tool support connects with another of said feeler members, the master cams associated with the feeler members being arranged on an auxiliary table which is positioned at a fixed height but which participates in the movements of the worktable in the two horizontal directions.

9. A machine for machining three-dimensional shapes of workpieces as set forth in claim 1, wherein one of the master cams is mounted on the worktable and another of the master cams is mounted on an auxiliary table, and wherein the feeler members individual to each master cam extends in planes aligned with the planes of said master cams 10. A machine for machining three-dimensional shapes of workpieces as set forth in claim 1, wherein one of the master cams is mounted on the worktable and another of the master cams is mounted on an auxiliary table, said master cams being disposed in planes having contours which correspond with sectional planes of the workpiece on which the machine operates.

11. The method of producing objects having three dimensional shapes which comprises coupling a workpiece with a machine tool, allowing relative movement between the workpiece and the tool in a single predetermined path, adjusting the path of movement of the tool in size and form, moving the workpiece with respect to the tool in one direction, moving the workpiece with respect to the tool in another direction and selectively controlling the adjustment of the size and form of the predetermined path for moving the tool in a variable curved path and in projected and retracted relation to the workpiece for producing an object having a three-dimensionally curved central axis and a cross section differing from section to section.

References Cited in the file of this patent

UNITED STATES PATENTS

| | | |
|---|---|---|
| 2,332,532 | Roehm | Oct. 26, 1943 |
| 2,818,000 | Zwick | Dec. 31, 1957 |